United States Patent
Eiler et al.

(10) Patent No.: US 8,397,162 B2
(45) Date of Patent: Mar. 12, 2013

(54) METHOD, PRINTING SYSTEM AND COMPUTER PROGRAM FOR GENERATING AND PROCESSING DOCUMENT DATA STREAMS

(75) Inventors: Goran Eiler, Poing (DE); Robert Wallner, Neuried (DE); Helmut Weiner, Munich (DE); Frank Matzke, Starnberg (DE); Hans-Detlef Groeger, Poing (DE); Jose La Rosa Ducato, Erding (DE)

(73) Assignee: OcéPrinting Systems GmbH, Poing (DE)

( * ) Notice: Subject to any disclaimer, the term of this patent is extended or adjusted under 35 U.S.C. 154(b) by 246 days.

(21) Appl. No.: 12/918,010

(22) PCT Filed: Feb. 23, 2009

(86) PCT No.: PCT/EP2009/052109
§ 371 (c)(1),
(2), (4) Date: Aug. 17, 2010

(87) PCT Pub. No.: WO2009/112352
PCT Pub. Date: Sep. 17, 2009

(65) Prior Publication Data
US 2010/0318901 A1    Dec. 16, 2010

(30) Foreign Application Priority Data
Mar. 3, 2008 (DE) .......................... 10 2008 012 329

(51) Int. Cl.
*G06F 15/00* (2006.01)
(52) U.S. Cl. ........ 715/276; 715/277; 358/1.15; 358/1.6; 358/1.9
(58) Field of Classification Search .................. 715/276, 715/277; 358/1.15, 1.6, 1.9
See application file for complete search history.

(56) References Cited

U.S. PATENT DOCUMENTS

| | | | |
|---|---|---|---|
| 6,236,463 B1 * | 5/2001 | Cyman et al. ................. | 358/1.14 |
| 6,407,821 B1 * | 6/2002 | Hohensee et al. ........... | 358/1.15 |
| 6,538,760 B1 | 3/2003 | Debry et al. | |
| 7,333,246 B1 | 2/2008 | Kowalski et al. | |

(Continued)

FOREIGN PATENT DOCUMENTS

| | | |
|---|---|---|
| EP | 0986003 A2 | 3/2000 |
| EP | 1538534 A2 | 6/2005 |

(Continued)

OTHER PUBLICATIONS

Mixed Object Document Content Architecture Reference—IBM—Data Stream and Object Architectures, Jan. 2004.

(Continued)

*Primary Examiner* — Cesar Paula
*Assistant Examiner* — Mohammed-Ibrahim Zuberi
(74) *Attorney, Agent, or Firm* — Schiff Hardin LLP

(57) ABSTRACT

In a method or system to generate a document data stream of a first format that is serially structured per page, document data of a second format that comprise multiple pages of a document are linked with the document data stream. In the document data stream of the first format a separate characteristic type mapping is provided that indicates that contiguous document data that comprise multiple pages are linked with the document data stream. In the first format a first page of the multipage document is completely and successfully run through a parsing process before document data of subsequent pages are run though the parsing process.

20 Claims, 3 Drawing Sheets

U.S. PATENT DOCUMENTS

| | | | |
|---|---|---|---|
| 7,434,160 B2 | 10/2008 | Peiro et al. | |
| 7,948,651 B2 * | 5/2011 | Truong et al. | 358/1.6 |
| 2005/0055476 A1 * | 3/2005 | Aschenbrenner et al. | 710/15 |
| 2008/0037047 A1 * | 2/2008 | Condon et al. | 358/1.13 |

FOREIGN PATENT DOCUMENTS

| | | |
|---|---|---|
| WO | 0068877 A1 | 11/2000 |
| WO | 2005111830 A1 | 11/2005 |

OTHER PUBLICATIONS

Steven R. Bagley et al., "Creating Reusable Well-Structured PDF as a Sequence of Component Object Graphic (COG) Elements", Nov. 22, 2003, XP-002459862.

Personalized Print Markup Language, Functional Specification, Nov. 2006, PODI: the Digital Printing Initiative.

* cited by examiner

Begin Object Container (BOC)　　　　　25
　　Object Environment Group
　　Object Container Data (Multi- page/image container)
End Object Container Begin Resource Environment Group (BSG)　　26
　　Map Data Resource (MDR)
　　Map Page Overlay (MPO)
　　Preprocess Presentation Object (PPO)
End Resource Environment Group (ESG)

Begin Page (BPG)　　27
　　Page Environment Group
　　...
　　Include Object (IOB)
　　　　Object area position, rotation, Mapping
　　　　Object name / type: multi-page PDF container
　　　　Object offset triplet (0x5A)
　　...
End Page (EPG)

Fig. 3

METHOD, PRINTING SYSTEM AND COMPUTER PROGRAM FOR GENERATING AND PROCESSING DOCUMENT DATA STREAMS

BACKGROUND

The present preferred embodiment concerns a method, a printing system and computer programs to generate and process document data streams. Depending on the field of application, in the generation and processing of document data various data formats have emerged in which the documents are generated and provided for additional processing at different output apparatuses (printing apparatuses, for example). For example, in the graphics industry the Postscript (PS) and Portable Document Format (PDF) data formats have been established that are optimized for encoding complex graphical structures. The PDF format has additionally been found in broad fields of office applications and, in the meantime, has been adopted as ISO Standard 15930 of the International Organization for Standardization. The Page Description Language (PCL) data format has been established in office environments.

In the field of high-speed output of digital data—for example to print invoices from databases of large-scale mainframes—the Advanced Function Presentation (AFP) data format has been developed, including its numerous additional developments such as—for example—Mixed Object Document Content Architecture (MO:DCA) and the Intelligent Printer Data Stream (IPDS) format, which is connected with the Mixed Object Document Content Architecture (MO:DCA) and optimized for output to printing apparatuses. The MO:DCA format, for example, is described in the specification "MO:DCA-Reference of International Business Machines Corporation (IBM)", IBM document number SC31-8602-06, 7th ed. (January 2004). What are known as object containers with which other data can be enclosed are explained on Pages 15 and 100 through 102 of this document. Object types that are registered in the MO:DCA architecture are listed on Pages 542 and 543. The "PDF Single-page Object" object type is cited there under the ID component 25, for example.

In U.S. Pat. No. 6,538,760 B1 a method is described with which PDF single-page objects (for example) can be generated for an MO:DCA data stream. A PDF data stream is thereby analyzed in a print server. There the data stream is deconstructed into individual pages and the individual PDF page data are output in object containers to a printing apparatus.

Furthermore, the Personalized Print Markup Language (PPML) data format, which is described in the "PPML 2.2", November 2006, PODi Organization, Rochester, N.Y., USA, was developed to output graphical information. In this data format it is also provided to adopt data of other formats as objects, for example PDF data (see Pages 27, 51 and 52 in this document). A corresponding method with which PDF data can be integrated into a PPML data stream is described in U.S. Pat. No. 7,434,160 B2. Via the "EXTERNAL_DATA_ARRAY" element the PDF data are thereby loaded as a complete file, the data are analyzed and then they are converted per object into what is known as a PPML template. PDF data are thereby selected per object, converted if necessary and transferred into the PPML template. This is then linked in turn with data of a PPML template and sent to a high-speed printing machine.

In a comparison of the aforementioned data streams it appears that data streams that are optimized for output to high-speed printing apparatuses (for example AFP or PPML) are exclusively structured per page. The data stream is thereby structured so that one page start command and one page end command are respectively provided for the pages, and the respective information for this page is between these commands. All information necessary for this page—in addition to the display objects as such, even the corresponding control information and supplementary information—is thereby either contained between these two page commands or already contained in the data stream in preceding pages or page-independent introductory information. After the termination of its page end command, each document page can thereby be completely processed immediately by a processing stage—in particular in a parsing process—in which the data of the document data stream are read, analyzed and interpreted corresponding to the language syntax.

The document data stream can thereby be extended immediately for a subsequent process (for example for a raster process) in which raster images are generated per page from the encoded page data. It is thereby possible—in particular in the processing of large data streams that contain a few ten or hundred thousand pages, for example—to already output the first pages of the data stream to a printing apparatus while the following pages are still running through preceding processing stages such as the parsing process and the raster image processor (RIP).

To the contrary, in other data formats (for example the PDF format) the data are not exclusively structured per page, such that first all pages or data of a PDF file must be read before a parsing process can completely resolve the page structure and can pass the data to a raster image processor (for example) for implementation of the raster process. For example, in the PDF format a reference table is provided at the end of the file, which reference table must be read before the pages of the document can be resolved.

A high time cost is thereby created in the process chain from the parsing process of the document to the output at a printing apparatus, in particular in the processing of data streams with a large page count, because the printing apparatus can only begin the printing process after the complete data stream has run through the parsing process.

In prior art FIG. 2 a method workflow is shown in, for example, a printing system 1 distributed by the applicant in which a print server 2 of the Océ PRISMA Production series and an Océ VarioStream 9240 color printing apparatus 12 are used.

For example, Postscript files 3 or PDF files 4 are thereby used to generate an AFP print data stream 13. The data are imported into the print server 2 and rastered there pixel by pixel with a raster image program (raster image processor, RIP) 5. The data that are rastered in this way are then converted into an AFP-specific image format IOCA (Image Object Content), and the corresponding IOCA objects 6 are supplied to an imposition program 7. Incoming Postscript or PDF documents that comprise a plurality of pages are thereby converted into IOCA objects in which precisely one rastered page of the document is contained per object. The IOCA objects that are thus generated per individual page are then individually supplied to the imposition program 7 in which the individual pages or IOCA objects are imposed correspondingly to a page order (impositioning). Details of such an imposition process are to be learned in WO 00/68877 A, for example. Individual items of page information can thereby also be modified or supplemented with additional data, for example can be subjected to a clipping process. The imposition program 7 then outputs AFP data in which the individual pages are output as AFP IOCA data in a new order and possibly with modified information. This AFP print data stream 13 is converted in a converter 9 into an IPDS print data stream 14 and then transferred from the print server 2 to a printing apparatus. In the printing apparatus 12 a data controller is contained that can interpret print data in one or more languages. An IPDS parsing program 10 interprets corresponding IPDS data and prepares these for additional processing in the printing apparatus, which then ultimately prints the data on a recording medium, in particular on paper by means of a character generator 11 in an electrophotographic process.

What is disadvantageous in the method shown in FIG. 2 is that a rastering of (under the circumstances) large PDF files must already be performed by the raster image program 5 at a very early point in time in the processing chain, which leads to a relatively slow speed of the total process. In particular, it is thereby a problem that no output at the printing apparatus can take place until the entire PDF files have run through the raster process.

The aforementioned documents are herewith incorporated by reference into the present Specification.

SUMMARY

It is an object to specify a method to generate and process a document data stream that is serially structured per page, into which document data stream document data of a second format can be embedded so that a high processing speed can be achieved in the output of the composed data stream.

In a method or system to generate a document data stream of a first format that is serially structured per page, document data of a second format that comprise multiple pages of a document are linked with the document data stream. In the document data stream of the first format a separate characteristic type mapping is provided that indicates that contiguous document data that comprise multiple pages are linked with the document data stream. In the first format a first page of the multipage document is completely and successfully run through a parsing process before document data of subsequent pages are run though the parsing process.

BRIEF DESCRIPTION OF THE DRAWING

FIG. 3 shows an exemplary data structure for an AFP print data stream.

DESCRIPTION OF THE PREFERRED EMBODIMENT

Figure 1:
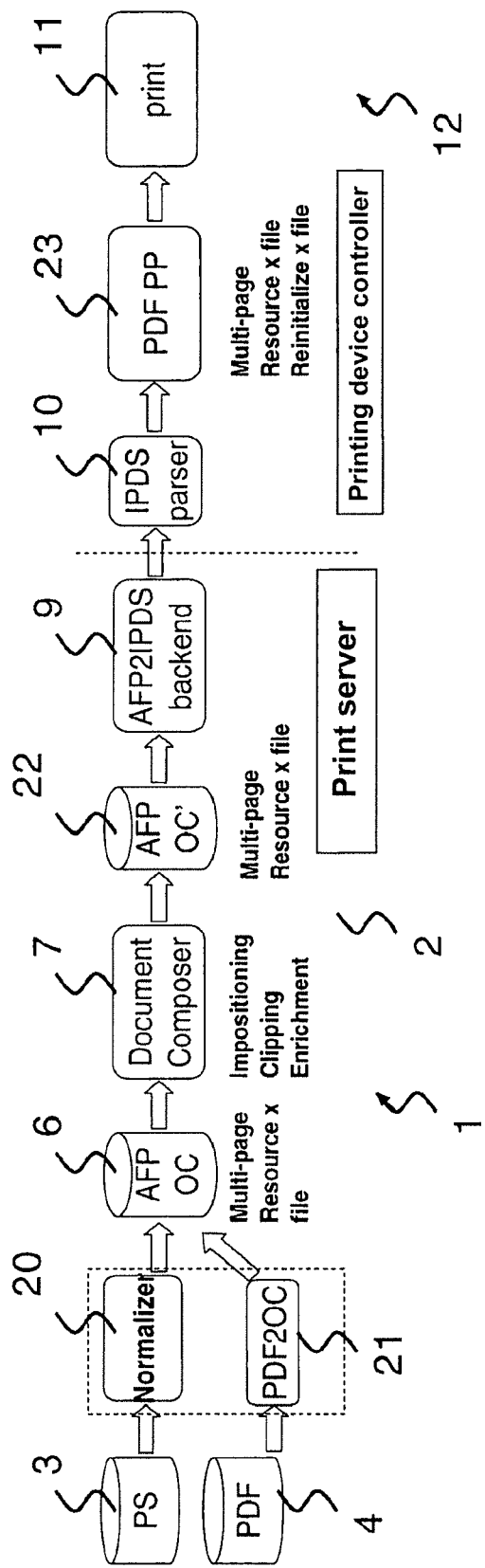
FIG. 1 shows a method to generate a print data stream according to the preferred embodiment.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and method, and such further applications of the principles of the invention as illustrated as would normally occur to one skilled in the art to which the invention relates are included.

According to the preferred embodiment, a document data stream of a first format that is serially structured per page is generated and/or processed. In the format the first page of a multipage document can be completely and successfully run through a parsing process before document data of the subsequent pages run through the parsing process. Document data of a second format that comprise multiple pages of a document (wherein common settings and/or resources apply for the pages) are linked with the document data stream. In the document data stream of the first format, a separate characteristic type mapping is provided that indicates that contiguous document data that comprise multiple pages are linked with the document data stream.

According to the preferred embodiment it was recognized that, in the processing chain of document data streams that are serially structured per page, the embedding of document data that comprise a plurality of pages but exist in a different format in which common settings apply on the one hand (for example a PDF data stream or common resources are used, for example a common character set that can be contained as well in the corresponding document data), an acceleration of the method can be achieved in that such data of the second format can be compactly embedded into the data stream of the first format. Via such an embedding it is possible to load this into subsequent process chains (in particular into a data controller of a printing apparatus) once in the processing of the data stream and to use the loaded data again given a later retrieval of pages of the same original document data stream. Such reusable data are in particular external resources that can be stored separate from the document data, for example character sets or recurring standing images. In particular in the AFP document data stream, there is a mechanism in order to load such resources once and to use them repeatedly as what are known as "secondary resources". With the preferred embodiment it was recognized that such resource handling is also possible with data of other formats (in particular PDF), and the processing of such resources in a data stream in which data of both formats are mixed can be correlated via the techniques according to the preferred embodiment.

Furthermore, with the preferred embodiment the advantage can be achieved that what are known as page program processes, for example the imposition, the selection of print media or the mixed output on different media types (what is known as mixplexing) and the supplementation of AFP objects (for example) that are typical for print production environments (for example BOCA bar codes or commands) are possible between post-processing apparatuses such as printing apparatuses, cutting apparatuses and enveloping apparatuses via a suitable protocol, for example via the standardized UP$^3$I protocol.

In particular, with the preferred embodiment it is achieved that common setting parameters or resources of the different pages of a document of the second format (for example PDF) can be repeatedly reused in the output process. Special techniques to provide these settings and resources at the individual page positions can thereby be spared, and in particular a reinitialization of the parsing process in the methods at the output side is no longer repeatedly necessary.

In particular, with the preferred embodiment it is proposed to execute a corresponding method in the generation of AFP data streams. However, it is also applicable for other document data streams (for example PPML) that are serially structured per page. Furthermore, the preferred embodiment in particular provides to use PDF data as embedded document data of the second format.

According to the preferred embodiment, corresponding files of the second format (for example PDF files) that contain a plurality of pages are transferred from a user program to the print server. In the print server they can thus advantageously be embedded into an AFP document data stream, in particular as what is known as an inline resource together with the remaining data stream, i.e. the data of the first format in a file whose superordinate primary structure corresponds to the first format.

The file of the second format can furthermore advantageously be transferred within a single AFP container, either as an inline AFP resource or also as what is known as an external resource in a file independent of the remaining document data stream.

The document data of the second format can also be stored in a file separate from the data of the document data stream, and the linking can occur via referencing. The file can thereby be processed as what is known as an external AFP resource, wherein the link to the document data stream of the first format occurs logically and via referencing data. The resource file thereby corresponds in particular to the first format in a primary structure superordinate to the data of the second format.

The file with the data of the second format can respectively be retrieved in associated page ranges of the AFP document data stream merely via references to this AFP multipage container, for example via the Include Object field (IOB) known from the AFP specification. The corresponding multipage AFP object containers are thereby systematically handled (with regard to generation, administration, identification, loading processes, caching processes and deletion processes) like other already known AFP object containers. With the preferred embodiment an extension is thus proposed that can be introduced without great architectural cost or modification to the AFP specification. On the other hand, with the preferred embodiment the speed in the embedding and processing of PDF data in an AFP data stream in which the PDF data comprise a plurality of pages can be achieved.

With the preferred embodiment it can advantageously be provided:
- that each multipage or multi-image container is handled like a standard AFP resource.
- The pages within the container are individually called up, wherein an indexing mechanism (page index) is added to an Include Object call (IOB). The indexing mechanism can in particular already be used in the document data of the second format (for example PDF) existing page-specific data for example the page number. A page can thereby be retrieved in the IOB call specific to that page using its number.
- The IOB calls are inserted into a standard sequence of page start and page end commands.
- Other, already known AFP control commands that are known at the page or sheet structure level (for example medium selection, finishing commands for apparatuses that process the output medium after the printing process, image rotation etc.) continue to remain available.
- Furthermore, other AFP object types—for example BCOCA, PTOCA, GOCA can also likewise be inserted into the AFP pages and be output together with the embedded document data of the other format.
- Multiple pages made up of different multi-PDF containers or of one PDF container can also be inserted within one page represented in AFP. The corresponding pages can be rendered superimposed or next to one another within the AFP page presentation.
- Furthermore, it can be provided that different pages of a multipage AFP container that do not share the entire set of common PDF properties result in a reinitialization of the PDF parser and/or PDF raster image processor in the processing process at the output side, for example in the printing apparatus. The respective PDF pages are then respectively processed individually with the corresponding PDF parameters and/or resources.

Although in the preceding reference was primarily made to PDF files with regard to the data to be embedded, the respective processes and settings can also be applied for data of other data formats, for example for PCL data as well.

In one advantageous exemplary embodiment, the document data of the second format are at the latest embedded with the data of the first page of the data stream in which a page of the second format is called. It can thereby be ensured that all information for the parsing process and raster process (that exists in the format of the second format) is provided in its entirety in the output-side processing of the data stream.

In particular, the data of the complete document of the second format are entirely transferred before those of the first page are called. This can take place within the first page presentation in the document data stream or even in a range with general, page-independent header resource that is transferred independent of the remaining data of the document data stream.

The multipage object container can be transferred to the output apparatus within the AFP data stream or also independent of the remaining data of the data stream.

The preferred embodiment can in particular be advantageously applied for document data of the second format in which—depending on the format—the entirety of the document data must be read and interpreted for the termination of a parsing process (in which the data are read, analyzed and interpreted) of the first page. If the data stream is an AFP data stream, it can in particular be provided that the type data field is of the "Object Container" resource type, wherein as a multipage object container it can in particular be differentiated from other object containers.

A separate, multipage-specific structure element can likewise be respectively provided for other document data formats that are structured per page (for example PPML).

A document data stream structured serially per page according to the preferred embodiment exists in a first format in which the first page of a multipage document can pass completely and successfully through a parsing process before document data of the subsequent pages pass through the parsing process. Document data of a second format that comprise multiple pages of a document are linked with the document data stream, wherein common settings and/or resources apply for the pages. In the document data stream of the first format a separate characteristic type diagram is provided that indicates that contiguous document data that comprise multiple pages are connected with the document data stream.

The data of the document data stream can be parsed for the further processing of a document data stream that is generated according to the preferred embodiment. In particular, the separate characteristic type diagram can thereby be registered, which characteristic type diagram indicates that contiguous document data that comprise multiple pages are linked with the document data stream. Furthermore, it can in particular be provided to have at least the portion of the document data of the second format that is used repeatedly pass through a complete parsing process before the data of the first page of the document at which data of the second document are referenced are additionally processed.

The parsed document data of the second format can thereby be stored and reused given a call by data of subsequent pages, at least until all pages of the document in which document data of the second format are referenced have likewise been parsed.

Furthermore, a file with the document data of the second format can be segmented into smaller files. These can respectively comprise multiple pages and then be linked with the data of the first format, in particular by means of a multipage object container.

According to the preferred embodiment, a computer program product corresponding to the method according to the preferred embodiment, a print server and a printing system are also provided.

Figure 2:
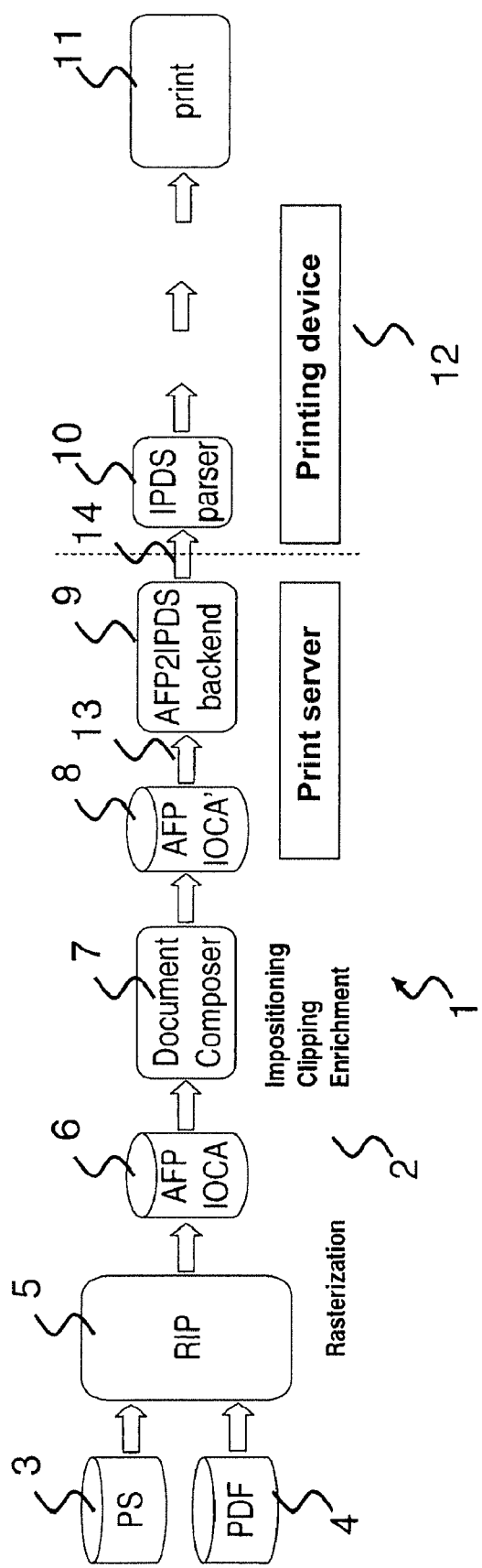
FIG. 2 illustrates a method to generate an AFP data stream according to the prior art.

Insofar as they relate to the same elements, the same reference characters as were already used in FIG. 2 (described in the preceding) are used in FIG. 1.

In the method workflow shown in FIG. 1, Postscript data are processed by means of a normalizer program 20 (for example the normalizer program known from Adobe Systems Inc.), and the data stream that is thereby generated is embedded in the AFP data format into a multipage object container 6. The same can occur with PDF data 4 by means of a conversion program 21. The AFP object container 6 that is generated in this way represents a resource. This resource can in turn be processed with the imposition program 7 so that a multipage object container resource 22 is created by means of which pages can be output in a different order according to the resorting conducted in the imposition program 7. In an IPDS parsing program 10 or the parsing process connected with this, the embedded Postscript or PDF data are successively unpacked, for example by means of a PDF parsing program 23. In the course of the first processed PDF data the respective superordinate or repeatedly utilized PDF settings or PDF references are thereby loaded, processed and cached. The cached data can then be successively linked (given a calling of the respective pages in connection with the individual page data occurring there) before they are output to the character generator 11. In this context it is also possible that predetermined image objects (for example logos) that are provided as resources are rastered once and repeatedly reused on the respective pages without a new raster process having to be respectively executed for the subsequent pages.

In FIG. 3 a data structure with control commands is shown that can be used in an AFP document data stream, for example. Object containers of the multipage or multi-image type are defined in a first data group 25. Resources are defined in a second range 26. The data necessary for an individual page are called in a third range 27. Given the serial execution of the data stream, the object container data of the range 25, the pre-process presentation object data of the range 26 and the included object data of the range 27 interact so that the corresponding page of the original PDF file is retrieved in the called page, wherein the PDF settings and resources can be reused by the previous execution, for example in the ranges 25, 26.

For AFP document data streams it is proposed to provide the following object container:
PDF Document Object
PDF Document Object with transparency These data objects contain a PDF document or a PDF file that can contain multiple pages. The object containers are sent from a print server to a printing apparatus, in particular in the basic state of the printing apparatus (for example in what is known as the home state of an IPDS-capable printer).

The data objects are identified by identifiers (HAID) and can be stored and activated via an AFP activated resource command. They can be inserted within a page or an overlay encoded in AFP via the IPDS command IDO.

The entire multipage document is activated via an AFP activate resource (AR) command. Individual pages or ranges of the document are not separately activated by this.

An advance rastering of either the complete document or individual pages of the PDF document or PDF file can be performed by means of an optional AFP rasterized presentation object (RPO) command. In particular very large or otherwise raster-complex, critical applications can increase the processing speed overall in the output of the document via such an advance rastering.

Via an optional page sequence number within the RPO entries it is possible to subject a specific page of a PDF document to the raster process in advance. If no page number is specified in the RPO entry, the entire document (meaning all pages or, respectively, images) is rastered.

If the complete document is rastered, a common set of control parameters from the RPO command can be used for all pages of the document. If pages or images should be rastered separately, each corresponding object can have a separate set of control parameters. Each object then contains its own entry within the RPO command.

The AFP Include Data Object (IDO) command is used to integrate a selected page of the PDF document into a page structure of an IPDS data stream or a corresponding overlay structure. The number of the desired page or the desired image can then be specified within an IDO Data Object Data Distriptor.

In the following it is described how a large PDF file (for example a book) is integrated into the AFP or IPDS data stream in which no additional processing or modification is conducted.

Step 1: The PDF document file is sent to the printer as a Homestate Object Container, HAID#0001.

Step 2: The optional RPO command is utilized in order to raster all pages of the document. If the RPO command is not used, the pages are first rastered in the next step.

Step 3: a loop is run through with the command sequence
Begin Page
Include Data Object (HAID#0001, Page N)
End Page All pages of the document are thereby serially executed and output.

A considerable acceleration in the processing of multipage PDF files is possible with the method described above. In order to further improve this it is also conceivable to segment large files into smaller files. For example, a PDF file comprising the data of 5000 pages, could be segmented into five smaller PDF files with 1000 pages each. For example, the time until the first printing can thereby be additionally shortened. However, in this case techniques must be taken with which it is indicated for later multipage containers that the same parameters (and possibly resources) apply for these as for the earlier multipage containers. For example, this can occur via a common identification number (ID). An additional identification number could be provided in order to indicate that multipage PDF files should be combined into a common AFP page.

Finally, it can be advantageous to provide within the AFP document data stream techniques via which an automatic raster process is activated or deactivated in the print server or in a printing apparatus. For example, this could occur via a new AFP medium map instruction.

Although a preferred exemplary embodiment is shown and described in detail in the drawings and in the preceding specification, it should be viewed purely as an example and not as limiting the invention. It is noted that only the preferred exemplary embodiment is presented and described, and all variations and modifications that presently and in the future lie within the protective scope of the invention should be protected.

We claim:

1. A method to generate a document data stream of a first format that is serially structured per page to be printed and that includes at least one multiple page document and at least one control command of said first format, comprising the steps of:
   in said first format document data stream linking contiguous document data of a multiple page document of a second format by use of said first format at least one control command, said second format document data being contained in a single first format object container without splitting the multiple pages of the document and also storing in said same single container corresponding resources for said second format multiple page document;
   also in said same single object container, providing reference data for calling pages of said second format multiple page document to be printed; and
   presenting the container containing the second format multiple page document along with said corresponding resources and calling reference data to a raster image processor so that the raster image processor has access by use of said single container to the multiple pages and the corresponding resources of said second format multiple page document.

2. The method of claim 1 wherein in the first format running a first page of the multiple page document of the first format completely and successfully through a parsing process before document data of subsequent pages are run through the parsing process.

3. The method according to claim 1 wherein the linking takes place via an embedding of the document data of the second format in the document data stream of the first format.

4. The method according to claim 1 wherein the document data of the second format are stored in a file separate from the data of the document data stream, and the linking takes place via referencing.

5. The method according to claim 2 wherein the document data of the second format are at the latest embedded with the data of the first page of the data stream in which a page of the second format is called.

6. The method according to claim 2 wherein given the document data of the second format, depending on the format, an entirety of the document data of the second format is read and interpreted for the complete parsing of the first page.

7. The method according to claim 1 wherein the second format is a Portable Document Format (PDF).

8. The method according to claim 1 wherein the second format is a Page Description Language (PCL).

9. The method according to claim 1 wherein the document data of the second format are indexed per page and a page index is formed.

10. The method according to claim 9 wherein in the further processing of the document data stream the pages are called individually using the page index.

11. The method according to claim 1 wherein the first format is Advanced Function Presentation (AFP), Mixed Object Content Architecture (MO:DCA), or Intelligent Printer Data Stream (IPDS).

12. The method according to claim 11 wherein a data field type of a resource type is a multiple page object container.

13. The method according to claim 12 wherein in further processing of the document data stream, pages within the multiple page object container are called via an include object instruction.

14. The method according to claim 1 wherein the first format is Personalized Print Markup Language.

15. The method according to claim 1 wherein a file with the document data of the second format is segmented into smaller files.

16. The method according to claim 1 wherein for further processing of the document data stream the data of the document data stream are parsed.

17. The method according to claim 16 wherein document data of the second format are completely parsed before data of a first page of the document are processed further.

18. The method according to claim 17 wherein parsed document data of the second format are stored and reused upon being called by data of subsequent pages at least until all pages of the document in which document data of the second format are referenced are parsed.

19. A non-transitory computer program tangibly embodied on a computer readable medium, and said computer program, when executed by said computer, generating a document data stream of a first format that is serially structured per page to be printed and that includes at least one multiple page document and at least one control command of said first format, said program performing the steps of:
   in said first format document data stream linking contiguous document data of a multiple page document of a second format by use of said first format at least one control command, said second format document data being contained in a single first format object container without splitting the multiple pages of the document and also storing in said same single container corresponding resources for said second format multiple page document;
   also in said same single object container, providing reference data for calling pages of said second format multiple page document to be printed; and
   presenting the container containing the second format multiple page document along with said corresponding resources and calling reference data to a raster image processor so that the raster image processor has access by use of said single container to the multiple pages and the corresponding resources of said second format multiple page document.

20. A printing system, comprising:
   a computer and a printer; and
   said computer executing a non-transitory computer program tangibly embodied on a computer readable medium, said computer program generating a document data stream of a first format that is serially structured per page to be printed and that includes at least one multiple page document and at least one control command of said first format by performing the steps of
   in said first format document data stream linking contiguous document data of a multiple page document of a second format by use of said first format at least one control command, said second format document data being contained in a single first format object container without splitting the multiple pages of the document and also storing in said same single container corresponding resources for said second format multiple page document,
   also in said same single object container, providing reference data for calling pages of said second format multiple page document to be printed, and
   presenting the container containing the second format multiple page document along with said corresponding resources and calling reference data to a raster image processor so that the raster image processor has access by use of said single container to the multiple pages and the corresponding resources of said second format multiple page document.

* * * * *